Patented Dec. 27, 1949

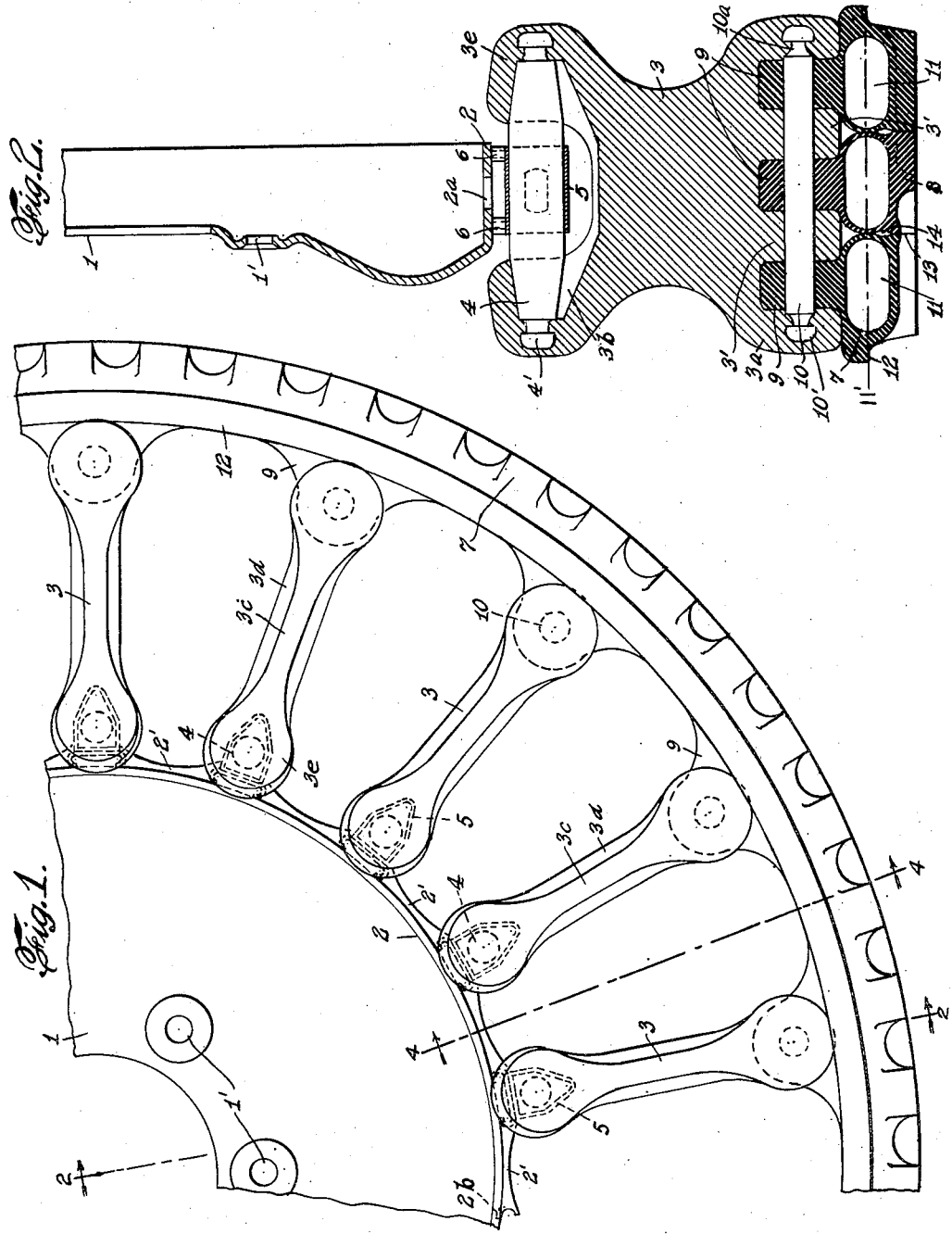

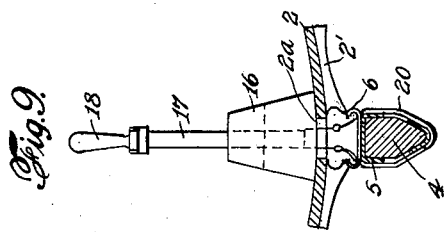
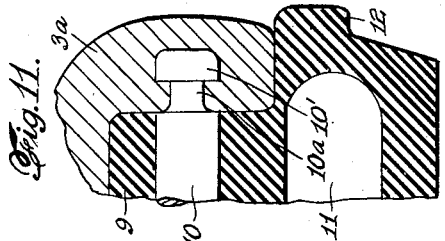
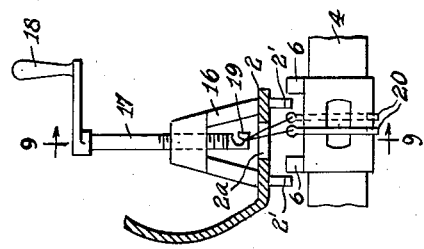
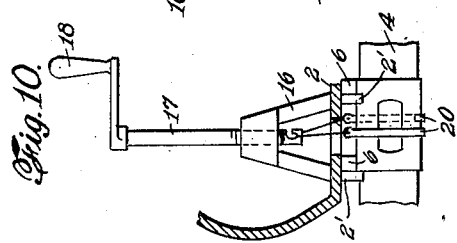
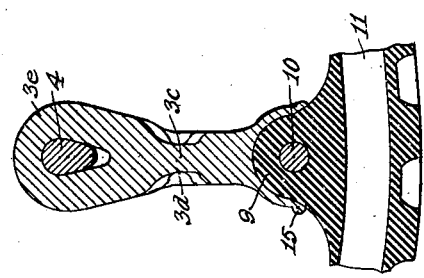
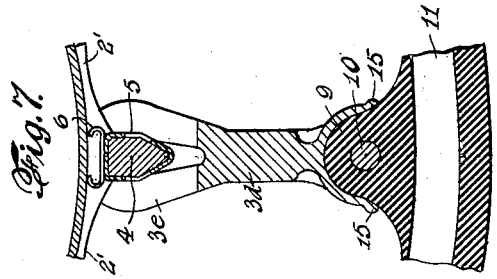
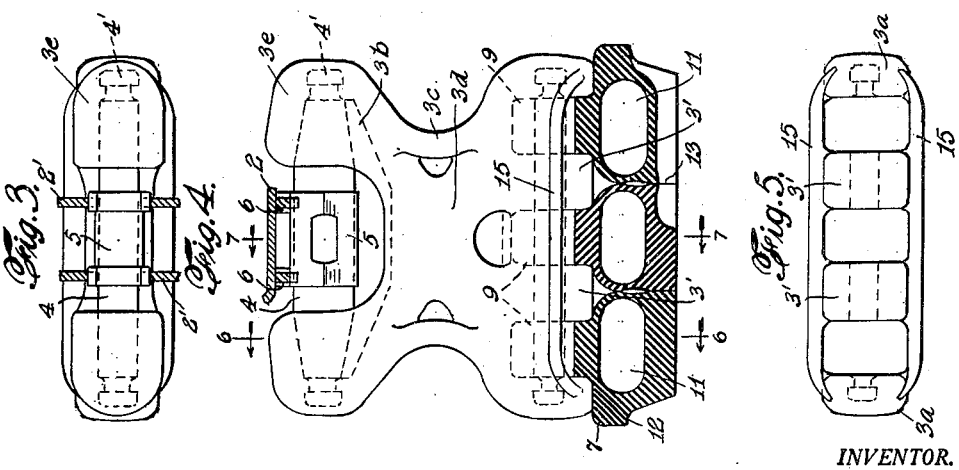

2,492,433

UNITED STATES PATENT OFFICE 2,492,433

LIGHTWEIGHT RESILIENT TIRE

James V. Martin, Rochelle Park, N. J.

Application October 28, 1944, Serial No. 560,728

6 Claims. (Cl. 152—7)

This invention relates to light weight resilient tires for all sorts of vehicles, particularly airplanes and automobiles.

The primary object of the invention is to free the people of the world from the dangers and troubles associated with the bouncing, skidding air bags known as pneumatic tires.

I acknowledge herewith that thousands of efforts have been made over a period of thirty years by inventors to obviate or at least mitigate the dangers and difficulties inherent in the air-inflated types of tires; and in such research many of the fundamental principles needed to afford safety and comfort in travel over rough roads have been developed and disclosed, but in practically every case, some essential to operability or at least practicability has been missing from the said disclosure and in consequence, as of the time this application is filed, the people of the world are victims of an anomaly in mechanics, i. e. the support of high centers of gravity upon laterally weak and flexible vehicle parts called pneumatic tires which cannot dissipate heat as fast as modern high speed requires and which are too weak laterally when designed to afford sufficient vertical yieldability.

A further object of my invention is to eradicate the present necessity of carrying a spare tire and to give the motoring public a means of varying the load carrying ability of their tires.

Still further objects of my invention will become apparent to those skilled in the art as I proceed with the explication of the following descriptions and drawings:

Figure 1 is a side elevation of one exemplification of my invention as applied to an automobile.

Figure 2 is a view in section through lines 2—2 of Fig. 1.

Figure 3 is a view looking outward from the wheel center at the inner end of one of my tire elements known as an elastic spoke.

Fig. 4 is a view, partly in section, taken along the line 4—4 of Fig. 1 and showing one of my elastic spokes intervening between the wheel spider of an auto and the three flexible tread hoops of my invention.

Fig. 5 is a view looking inwardly toward the wheel center and showing the association of spoke and tread hoop lugs which form the connection between my elastic spokes and the tread hoops of my tire.

Fig. 6 is a view in section along the line 6—6 of Fig. 4.

Fig. 7 is a view partly in section taken along the line 7—7 of Fig. 4.

Fig. 8 shows a simple type of jig and its relation to the assembly of one of my elastic spokes into the resilient tire.

Fig. 9 is a view taken along the line 9—9 of Fig. 8 and

Fig. 10 is a view showing the tensioned position of one of my spokes when readied for final connection with the automobile wheel.

Fig. 11 is an enlarged view of the form of lockpin end for my outer spoke lug.

Proceeding now with the more detailed explanation of my invention similar numerals will be used to designate similar parts throughout the several views.

1 indicates the disc of a conventional automobile wheel; it is of the so-called demountable nature and has holes 1' stamped into it for mounting on the hub of a vehicle. 2 indicates a flattened outer portion or rim for the said disc wheel. 3 indicates the elastic spoke element of my new tire which is connected to the wheel rim 2 by means of a crossbar 4, preferably made of impregnated wood and having a press fitted steel band 5 surrounding its central part: steel clips 6 having semicircular end portions are welded to the band 5 so as to allow a slight flexibility in their end portions which fit snugly into the ends of brackets 2' located on and forming part of the wheel rim 2. It will be noticed, see Figs. 4 and 8, that for each spoke 3 there are two clips 6 and one end portion of each clip is designed to be pressed into contact with the semi-circular portion of one end of a wheel bracket 2'.

The elastic spokes or members 3 form a yielding connection between the wheel rim 2 and flexible tread hoops 7 and 8 which comprise the outermost portions of my new type tire.

Each spoke is yieldably connected to the said tread hoops by means of interlocking spoke lugs 3' and 3a and tread hoop lugs 9; a pin 10, preferably of impregnated hickory, hold the lugs in compressed relation with each other.

It will be noticed that each spoke has molded sockets at both its outer lug positions 3a and the pin 10 has a button head 10' located in the said spoke socket beyond a pin neck 10a. The molding pin for these sockets is smaller than the hickory pin and in consequence the rubber or rubberlike material of the spoke is forced to expand over and around the said pin. Also the length of the hickory pin is less than that of the molding pin and requires compression of the material of the spokes and also of the tread hoop lugs 9 when the tire assembly takes place. I advise use of soap-water in assembling the various lugs over the hickory pin. First the spoke lugs 3' are assembled to the tread hoop lugs 9 by pulling lugs 3a out of the way and then with clamp pressure and liberal use of soap water in and around the sockets the end lugs 3a can be forced into place.

Each of the three tread hoops is bonded to and around an impregnated wood filler 11 and the outer tread hoops 7 carry a curb contacting ledge shaped bead 12 which guards all other portions excepting the tread of the tire from injury due to contacts. Naturally the outer tread portions of the tires are in normal engagement with the road and by looking at Figs. 1, 2 and 4 it will be seen that the tread openings alternate in position around the tire. A broken line 11' Fig. 2 marks the neutral transverse stress axis for bending strains in the fillers 11.

The contacting portions 13 of the tread hoops 7 and 8 are under an extra compression by reason of being molded larger across their width and this compression combines with the openings 14 to prevent stones or dirt getting in between the tread hoops in road use. An additional tension is put upon the outer tread and spoke lug assembly by a bead 15 of the spokes.

The crossbars 4 which are used as part of the connection of the spokes 3 to the rim 2 have button heads 4' fitting tightly into sockets molded into the inner parts of the spokes and it will be noticed that the socket 3b outwardly of the crossbar near its central part is much larger than necessary for accommodation of the crossbar. This feature of my invention allows the spokes on the bottom of my tires to move inwardly toward the wheel center without carrying compression loads to the axle. All of my spokes are assembled into the wheel under initial tension greater than that needed to carry the static loads plus ordinary road bumps, but on severe bumps provision should be made to prevent the spokes from passing compression loads to the car axle. The rubber around the buttonheads of the crossbars will not carry compression loads to the axle because of the inward curve of the spoke bead 3c. The principal portion of my spokes is the diagonally crossing ribs 3d which expand into the straps 3e and give lateral strength to the tire. Fig. 6 shows how the crossbar is tapered so as not to rub the straps where they work. The purpose of the crossbar form is to provide a saddle for the rubber straps. These also are molded closer together than the crossbar permits, the purpose being to create enough pressure of the rubber to prevent surging of the rubber on the crossbar.

Figs. 8, 9 and 10 show a simple method of assembling one of my spokes into a wheel-tire combination. An elongated hole 2a is located in the rim 2 between the ends of each pair of brackets 2'. I provide a bell shaped jack 16 with a screw 17 and a handle crank 18; from a swivel 19 on the end of the screw 17 are two flexible cables with a hook 20 on the end of each. These hooks are adapted to fit, one on opposite sides of the cross bar near its center: as shown in Figs. 8 and 9 the cross bars of the relaxed spokes will not register or enter their clips 6 between the wheel rim brackets 2' until they are tensioned by using the crank 18 they can then be raised into a position shown in Fig. 10 and then pressed into position as shown in Figs. 4 and 7, where a shallow slot 2b in rim 2 holds clip 6 from slipping.

It will be seen from the foregoing that I have disclosed a practical light weight tire which affords extremely easy riding comfort and obviates most of the dangers and troubles of present day inflated type tires. For example, the form of my spokes causes them to buckle readily under severe blows after their initial tension and other movement has been exhausted, thus affording a greater total movement under shock than a conventional pneumatic tire, but this is accomplished at none of the lateral risks incident to the inflated tire because the diagonally crossing spoke ribs 3d are given a direction and thickness which more than doubles the lateral strength of an inflated tire for same size loads. Furthermore the excess strength of my spokes is sufficient to permit the omission of half their number without danger to the vehicle. In order to graduate the tire strength in varying loads every third spoke could be omitted and of course 20 or more or less spoke positions can be built into the tires.

Instead of building up destructive heat as inflated tires do at high speeds my tires fan themselves and the vehicle brakes and the air movement increases about the tire parts with the speed. All parts of the tire are flexible and cooperate together in curb climbing and every other function. The form of tread at the lateral margins of the tire, see 12 of Figs. 2 and 4, enables the ledge of rubber to climb curbs or railway tracks at small angles, those familiar with rubber understand that a protruding ledge of rubber such as that shown will deform and hold to a curb contact.

The tread hoops being flexibly connected to each other have a liberal range of independent action for smooth travel over rocks which do not extend the full width of the tread. The individual spokes are easily removable for lesser loads or replacement in case of injury such as bullets might occasion: the extreme ends of the clips 6 spring into shallow slots in the rim 2 to hold them in their final position.

Among the important improvements in detail of construction the following should be noted: The composition and shape of the hoop fillers 11 is crucial. In the first place the wood can be lightened and greatly strengthened against bending by sulphur bath impregnation: To accomplish this make up a circular shaped tank with steam coils along the inside walls, have enough room inside the coils to place the hoop fillers horizontally between the coils. Have a cover for the tank and an outlet for sulphur fumes. Fill the lower half of the tank with mine run sulphur and bring up the temperature to 280 degrees Fahrenheit, then lower the fillers, preferably in a cage, into the liquid sulphur and keep immersed for fifty minutes: then raise the cage with the filler hoops into the hot air chamber above the sulphur and allow them to drain for ten minutes, then take off tank cover and wipe fillers quickly with dry cloth and place in a horizontal plane till cool. This process has lowered the weight of hickory fillers 10% and raised their resistance to bending 70%, furthermore the natural moisture in the wood is replaced by sulphur and the wood will not thereafter warp or change its form or absorb water and bonding to a rubber envelope is improved. However the generally oval form shown in Figs. 2 and 4 combines to make the fillers suitable for tires by lowering the fibre stresses, particularly in tension, over other shapes I have previously shown in tire patents. The symmetrical shape of the fillers i. e. symmetrical about a horizontal axis, see 11' of Fig. 2, having their least dimension in the vertical plane and approximately double said dimension for horizontal width with rounded sides, see Figs. 4 and 11, aids greatly in producing a more flexible tire with postponed flexing fatigue, while the rounded sides of the fillers combines with the best form for the tread envelopes and also blends with the type of vertical bending stresses set up in the hoop fillers. Tests have shown the ability of such a hoop filler to actually take a reverse curve bend without apparent injury. Also the shape recommended somewhat resembling an ellipse, aids in securing uniform molding pressures and consequent uniform bonding which is most important to long life and a cool tire.

Impregnating the crossbars 4 not only strengthens them, thus saving weight, but also prepares the hickory or other wood so it will receive a press fit of metal band, such as 5 of this disclosure and hold said band for years without looseness because of the fixed nature of the wood after impregnation.

In my former disclosures the button heads of the hickory lock pins 10 were square cornered in views like Fig. 2, but in practice it was found that such sharp outer edges on the button 10' formed an airlock preventing the ready seating of the oversize button in the socket, consequently the outer portion of the button should be well rounded as shown in Fig. 11 while its inner side at the neck 10a should be sharp to prevent the button coming off the head, also a good radius should be turned on the inner part of the neck for strength.

If the form of the outer spoke lugs 3a is rounded as shown that combined with the form of neck and button will make for easy assembly and prevent anyone pulling the end lugs off with their fingers, which could be done with the forms of lugs and pins shown in my former patents. Some of these details may seem trivial in themselves, but their effect is cumulative especially in combination with related parts and their combined effect may be the demarkation between a practical and an impractical tire.

The extension of the usual spider flange 2 to form the wheel rim for my type tire saves weight and complication. The form of outer tread having transverse ribs with a curved portion ending in the ledge-like bead 12 affords excellent curb climbing ability, especially when combined with an oval section flexible filler and the yieldable hoop-spoke connections, this permits one outside hoop to grab and hold onto the curb or R. R. track, while the adjacent hoops and their lugs cooperate to transfer the loads from the axle.

Having thus described my invention and its mode of operation it will be evident to those skilled in the art that a wide range of adaptability may be had without departing from the teachings of the disclosure and what I claim and desire to protect in particular is:

1. In combination with a vehicle wheel rim and flexible tread tire hoops, the outer of said hoops provided with a curb contacting bead, elastic tire spokes carrying the said rim in tension from the upper portions of the said hoops, each said spoke having diagonally crossed ribs for lateral strength of the said tire and said ribs terminating at their lateral outer ends in a lug provided with a button head socket, a button headed oversize pin located in the said socket and forming each connection between said spoke lug and the said hoops and the portions of the said lug lying outwardly of the said socket being rounded in all sections containing the longitudinal axis of the said pin and located inwardly of the said bead.

2. In combination with a wheel rim and flexible tire tread, elastic spokes carrying the said wheel weight in tension to the upper portions of the said tire tread, wooden crossbars forming part of the connection between the said wheel rim and each said spoke, each said crossbar impregnated with sulphur and press fitted within a metal bracket of the said rim-spoke connection, whereby said wood within said metal is rendered comparatively free from moisture and heat changes which would loosen it from its said metal bearing and said crossbars are strengthened as beams.

3. A vehicle tire and wheel combination wherein the loads of the said wheel are carried in tension through elastic spokes to flexible tread hoops, each of the said hoops containing a fibrous stiffening member impregnated with sulphur to increase its strength and sulphur impregnated crossbars press fitted within metal connections to the said wheel, said crossbars held within button headed sockets of the said spokes.

4. A tire and wheel combination wherein elastic spokes carry the wheel loads to the upper part of a multiple tread hoop portion of said tire, flexible connections between each said spoke and the outermost tread hoop on each side of the said tire and a ledge shaped protrusion of rubber extending circumferentially around the outside of each said outermost hoop and adjacent the said connections, whereby upon contacting the said tire to a curb at a small angle the said ledge will deform and facilitate climbing the said curb.

5. In combination with a rubber-like tire tread envelope, a wood filler located within said envelope, said filler provided with rounded sides and having a horizontal neutral bending axis approximately double the said filler's vertical cross sectional dimension, the said filler symmetrical about both its major and minor axes.

6. A tire and wheel combination wherein elastic spokes carry the wheel loads to the upper part of a flexible tire tread, the said tread including a fibrous hoop impregnated with sulphur to a limited degree and said degree of impregnation determined by a bath of substantially an hour's duration in hot liquid sulphur followed by a hot air temperature draining process, whereby the said hoop is lightened in weight and rendered more resistant to bending stresses.

JAMES V. MARTIN.

REFERENCES CITED

The following references are of record in the file of this patent:

UNITED STATES PATENTS

| Number | Name | Date |
|---|---|---|
| D. 33,338 | Ducasble | Oct. 9, 1900 |
| 542,842 | Buckner | July 16, 1895 |
| 1,599,135 | Kobbe | Sept. 7, 1926 |
| 2,283,274 | Martin | Mar. 19, 1942 |
| 2,331,212 | Martin | Oct. 5, 1943 |